No. 855,197. PATENTED MAY 28, 1907.
P. G. OLDS.
WATER HEATER.
APPLICATION FILED JULY 30, 1906.
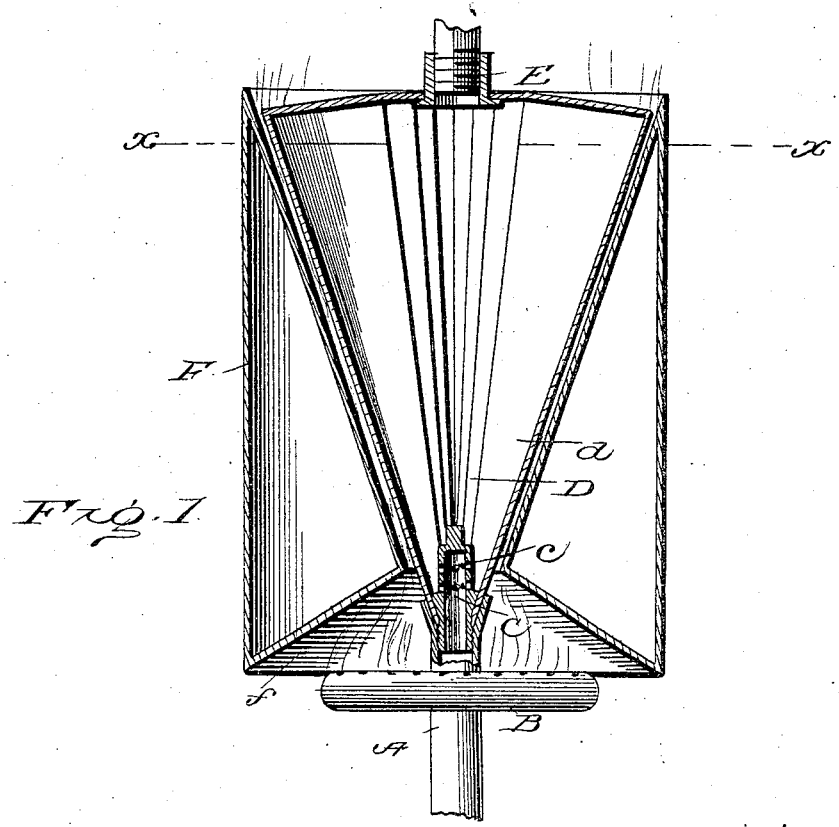
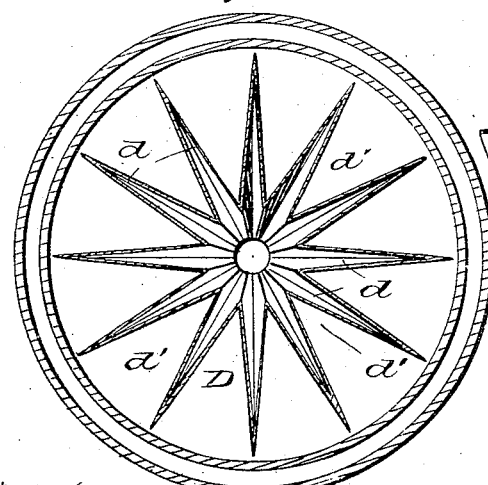
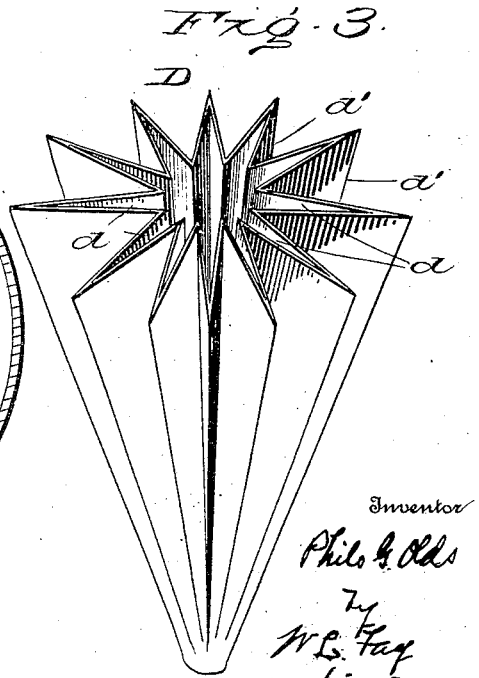
Inventor
Philo G. Olds

UNITED STATES PATENT OFFICE.

PHILO G. OLDS, OF ELYRIA, OHIO.

WATER-HEATER.

No. 855,197.  Specification of Letters Patent.  Patented May 28, 1907.

Application filed July 30, 1906. Serial No. 328,301.

*To all whom it may concern:*

Be it known that I, PHILO G. OLDS, a citizen of the United States, residing at Elyria, in the county of Lorain and State of Ohio, have invented a new and useful Water-Heater, of which the following is a specification.

My invention relates to improvements in water heaters for quickly heating flowing water passing through pipes, or what is commonly known as instantaneous water heaters, and the object of my invention is to provide such a heater as will quickly heat water with a small consumption of fuel and be cheap of construction. I attain these objects by the mechanism illustrated in the accompanying drawings in which—

Figure 1. is a vertical sectional view of my invention; Fig. 2. is a top sectional view of my invention in the dotted lines X, X, of Fig. 1; and Fig. 3, is a perspective view of the heating receptacle.

Similar letters refer to similar parts throughout the several views.

The heating receptacle, D. is cone shaped and is formed preferably of a single sheet of metal stamped up with deep projecting, longitudinal folds, $d'$, $d'$, starting at the top and gradually tapered smaller as they extend downward to the lower end, where they are terminated; and at this end a hole of sufficient size is constructed to engage with a water pipe, A. The inner tops and center between the folds are inclosed or covered by a top attached thereto, to which is secured a discharge pipe, E. In the lower end of the part, D. is secured a pipe C having small holes, $c$, $c$, opening into each of the openings formed by the folds, $d'$, $d'$, of the part, D.

Outside of and surrounding the part, D. is a casing, F. open at the top, and at the lower end concaved on the under side; Underneath is secured any ordinary heating burner as represented by, B. The pipe, A. or E. may be provided with any ordinary water cock to regulate the flow of water.

The operation of my invention is as follows, The pipes and receptacle, D. being filled with water; and heat being supplied by means of the burner, B. at the lower end, at which point it is most intense, strikes the lower end of the receptacle and passes as it becomes cooler, up between the outside of the folds, $d'$, $d'$, which provide a large amount of surface and a small volume of water, and rapidly absorb all the heat in the escaping gases, after which they pass on out of the top comparatively cool.

Having fully described my invention and its operations what I claim as new and desire to secure by Patents of the United States is, In a water heater, a cone shaped water receptacle provided with vertical, wide, triangular shaped folds, covered top and bottom, provided with suitable supply and discharge pipes, in combination with suitable inclosed casing, as a heat confining element, and a suitable heat burner, or heat producing element, all as above set forth and substantially described.

In testimony whereof I have signed my name to this specification in the presence of two subscribing witnesses.

PHILO G. OLDS.

Witnesses:
 L. D. HAMLIN,
 W. B. JOHNSTON.